United States Patent Office 3,836,486
Patented Sept. 17, 1974

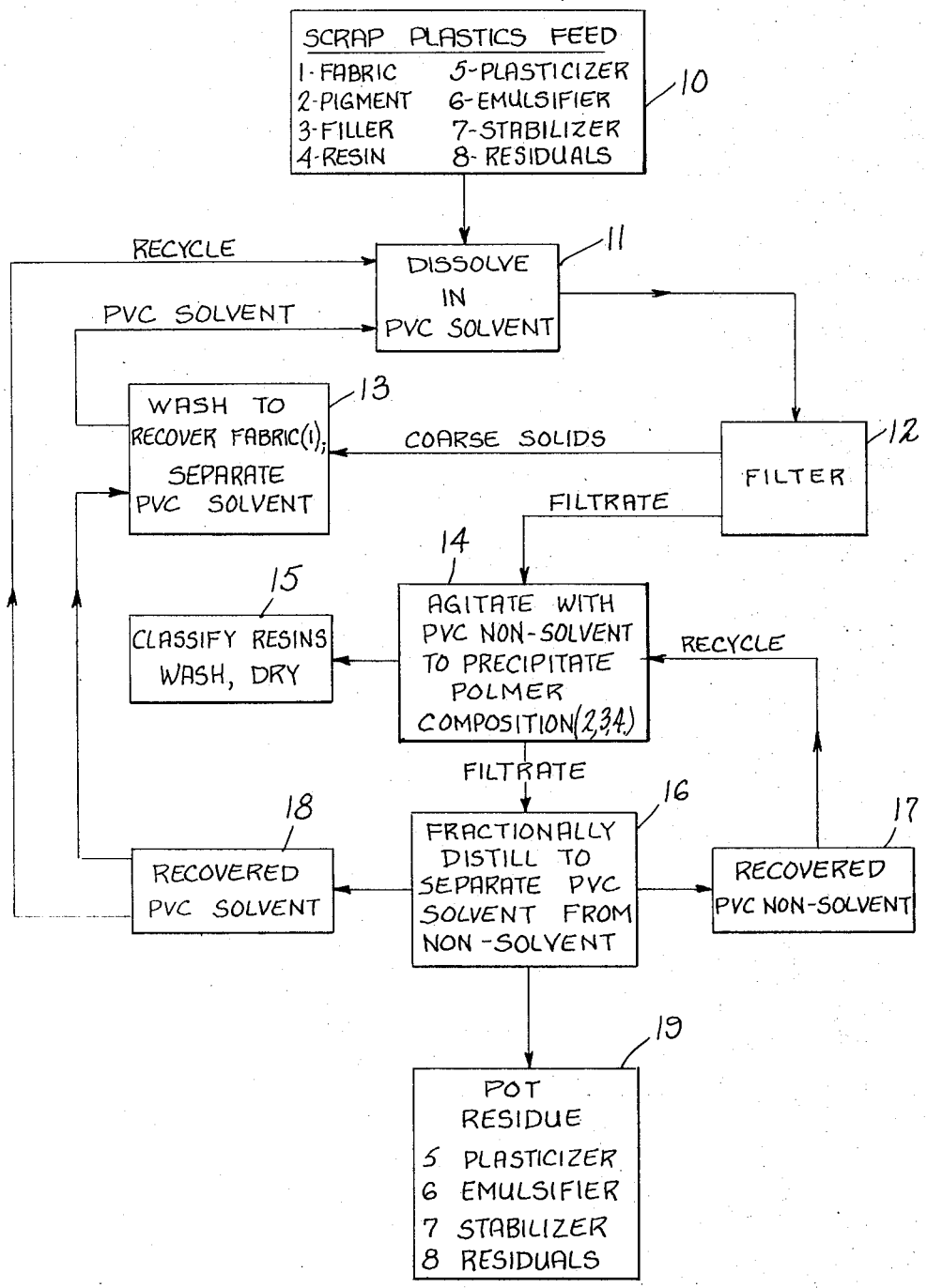

3,836,486
VINYL CHLORIDE POLYMER RECOVERY
PROCESS
Edwin A. Hafner, Woodbridge, Conn., assignor to Hafner
Industries, Inc., Woodbridge, Conn.
Continuation-in-part of abandoned application Ser. No.
106,183, Jan. 13, 1971. This application June 19, 1972,
Ser. No. 264,026
Int. Cl. C08f 29/18, 47/24
U.S. Cl. 260—2.3                                     14 Claims

ABSTRACT OF THE DISCLOSURE

Reusable vinyl chloride polymer and copolymer and other components such as plasticizers are reclaimed from scrap plastics by contacting the scrap plastics with a solvent for the vinyl chloride polymer, contacting the resulting liquid phase with a substantially non-aqueous non-solvent for the polymeric portion, and then separating the resulting insoluble phase containing the vinyl chloride polymer. Following the removal of this polymer portion, the filtrate is fractionally distilled to recover the solvents, non-solvents, plasticizers and other ingredients. Typical solvents are methylethyl ketone, methylisobutyl ketone, cyclohexanone, dimethyl formamide, tetrahydrofuran and ethylene dichloride. Typical non-solvents are methanol, ethanol, isopropanol and n-butanol.

The recovered vinyl chloride polymer compositions may contain pigments and fillers, and exhibit improved performance on recycling in the fabrication of plastic articles.

BACKGROUND OF THE INVENTION

This application is a continuation-in-part of application. Ser. No. 106,183 filed Jan. 13, 1971, and now abandoned.

This invention relates to the reclamation or recovery of vinyl chloride polymer compositions from scrap plastics and includes the separation of a resuable plasticizer composition from such scrap plastics as well. In another aspect, the invention relates to the recovery of a vinyl chloride polymer composition and a plasticizer composition therefor, from scrap plastics or to the upgrading of offgrade resins, and the reuse of these compositions as compounding ingredients by recycling in a plastics fabrication facility.

One aspect of the problem of enhancing environmental quality is the abatement of pollution due to solid wastes. Because of their proliferation in a wide variety of articles and manufacture, and their relative resistance to bio-degradation, plastics have become a major contributor to pollution. Even in those instances where incineration is permissible, many such plastics evolve poisonous or corrosive fumes.

The problem is especially acute in connection with the disposal of plastics produced from vinyl chloride polymers since such polymers comprise the major proportion of vinyl-type plastics, these plastics accounting in 1969 for about 20% of a total U.S. manufacturing output of 18.5 billion pounds of plastics. For example, vinyl chloride polymers are consumed in the fabrication of building and construction materials such as conduits, fittings, windows, awnings, and liners for swimming pools, clothing such as infant pants, foam interliners, shoes, and rainwear; flooring such as vinyl asbestos tile; home furnishings such as appliances, garden hose, shower curtains and closet accessories, tablecloths, uphosltery and wall coverings; packaging such as containers, bottles, and food wrap film; phonograph records; toys and sporting goods such as balls, dolls, models, inflatables, swim fins, wheels, and golf bags; vehicular uses such as auto mats, upholstery, seat covers and crash pads; and a great variety of miscellaneous uses such as tarpaulin-type covers, credit and playing cards, medical tubing, and coatings and paints of various types. In addition to waste from consumer use, vinyl chloride plastic scrap occurs in considerable quantities from formulation or production errors, and trimmings from fabrication.

Since most plastics based upon vinyl chloride polymers are produced, compounded and fabricated to contain a host of other ingredients, such as stabilizers, plasticizers, pigments, fillers, and supporting substrate, it has not been thought economical to date to attempt reclamation of the components of vinyl polymer plastics, and the pollution problem due to inadequate disposal has continued substantially unabated, including the production of objectionable hydrogen chloride fumes when such scrap plastics are incinerated.

Objects and Summary

Accordingly, an object of the invention is to provide an economical process for recovering valuable ingredients from scrap plastics resulting from the manufacture of articles from vinyl chloride polymers.

Another object of the invention is to provide a process whereby the pollution of the environment by the discarding or incineration of plastics based upon vinyl chloride polymers may be substantially abated.

Still another object of the invention is to provide a method whereby trimmings and other scrap from the fabrication of plastic articles from vinyl chloride polymer compositions may be treated to produce valuable components for recycling into the plastics compounding and fabrication processes.

Still another object is to provide for total recovery and reuse of substrates of metal, paper, textiles and the like as a benefit of a polymer recovery process.

These and other objects, features and advantages of the invention will in part be obvious and will in part be apparent from the specification.

In summary, the invention is based on the discovery that valuable components of scrap plastics resulting from the manufacture of articles from vinyl chloride polymers may be separated by sequentially contacting the scrap plastic with a solvent for vinyl chloride polymer and a substantially non-aqueous non-solvent for the same, accompanied by appropriate separation and/or purification of the ingredients of the mixture. The solvent and non-solvent are selected for mutual miscibility.

An outstanding benefit of a preferred embodiment of the invention is the recovery from scrap plastic of a vinyl chloride polymer composition mainly containing resin, pigments and fillers, and a plasticizer composition when the scrap plastics feed is a non-rigid material. It has been discovered that the reclaimed vinyl chloride polymer composition has superior performance (such as dispersibility and processibility) as compared with virgin vinyl chloride polymer, when recycled in plastics fabrication with the reclaimed plasticizer composition or with components from other sources, including blends with virgin resins and virgin plasticizers.

The invention accordingly comprises the several steps and the relation of one or more of such steps with respect to each of the others, the compositions resulting from the reclamation process possessing the features, properties, and relation to such compositions or components thereof, which are exemplified in the following detailed disclosure, and the scope of the invention will be indicated in the claims.

Detailed Description

The recovery process of the invention is effective with a variety of scrap plastics feed containing a vinyl chloride polymer. The term "vinyl chloride polymer" is intended in this specification to include not only homopolymers of vinyl chloride, that is, polyvinyl chloride, but also thermoplastic copolymers of vinyl chloride with one or more different monomers, such as vinyl acetate, propylene, alkyl vinyl ether, and the like, and vinyl chloride as a monomer or polymer chemically modified (for example, cross-linked or internally plasticized) with polymers such as polypropylene, acrylonitrile-butadiene-styrene, and the like.

The term "vinyl chloride polymer composition" is intended in this specification to mean mixtures of one or more of such vinyl chloride polymers with one or more of the additives normally present in the fabrication of articles from vinyl chloride polymers, such as pigments and fillers. The scrap plastics feed may also contain other ingredients, such as stabilizers, emulsifiers, plasticizers, oils, waxes, flame retardants, ultraviolet absorbers, antioxidants and various processing aids, and other polymers and copolymers such as styrene-acrylonitrile, nylon, polystyrene, polyolefins (such as polypropylene and polyethylene), polycarbonates, polyacetals, polyurethanes, polysulfones, acrylonitrile-butadiene-styrene, cellulose-acetate-butyrate, and the plastics mixtures generally referred to as "polymer alloys."

The process of the invention is adapatble to separation of vinyl chloride polymers from non-plastics such as fabrics (cotton and the like) and non-plastic additives usually found in such polymers, and from different polymers, such as cellulosics (paper), polyurethane, polyethylene, polypropylene, and polystyrene. The process is especially applicable to separation from vinyl chloride polymers of the plasticizer composition used for non-rigid articles of manufacture.

As employed herein, the term "plasticizer composition" means a composition containing a major proportion of a vinyl chloride polymer plasticizer, alone or in admixture with a minor amount of the vinyl chloride polymer, and other ingredients usually present in the manufacture of articles from vinyl chloride polymers such as stabilizers and emulsifiers, but excluding essentially all pigments and fillers.

As will become apparent, an outstanding advantage of the invention is the separation of the scrap plastics feed into two or more major components, a vinyl chloride polymer composition which contains pigments and fillers, and a plasticizer composition which contains emulsifiers, stabilizers and substantially all of the remaining ingredients of the scrap plastics feed. If the scrap plastic contains a substrate material, this also is recovered. The vinyl chloride polymer composition when so recovered exhibits superior performance, particularly when remixed and recycled with the recovered plasticizer composition in the manufacture of vinyl chloride polymer articles, as compared with the processing of virgin vinyl chloride polymers.

The value of the process is related to the value of the recovered products. Accordingly, the proportion of vinyl chloride polymer in the plastics feed is not significant except where the balance of the scrap plastic has little or less value. For example, scrap containing cotton fabric as the major component may not be valuable for recovery. On the other hand, nylon and silicones and other plastics usually are valuable recovery products. Hence, reclamation of the ingredients from a vinyl chloride plastics feed containing relatively small amounts of vinyl chloride polymer but large amounts of the more valuable and recoverable material would still make the process economical.

The scrap plastics feed may have any physical form suitable for contact with the vinyl chloride polymer solvent and the vinyl chloride polymer non-solvent. Accordingly, the feed may include discarded finished vinyl chloride articles or scraps, and trimmings resulting from fabrication of vinyl cholride polymer articles. Often, the scrap plastics feed will contain a substrate such as fabric which is bonded to or impregnated with a vinyl chloride plastic composition (e.g., coated fabrics) such as moisture resistant clothing or coverings of various types. Other substrate materials include metals, paper and inorganic materials commonly found in electrical conductors, milk cartons, and the like. For efficient practice of the process, the scrap plastics feed preferably is shredded, comminuted, or otherwise reduced in size before contacting with the solvent.

The selection of vinyl chloride polymer solvent and non-solvent is an important aspect of the process. A principal criterion is their mutual miscibility to the extent that a single phase liquid system will result. In the usual case the solvent and non-solvent will be mutually miscible in all proportions, but less than complete mutual miscibility will be acceptable provided the resulting mixture is essentially a single phase.

Water should be excluded as much as possible from the system. Should the plastics feed contain or absorb water, the water should be substantially removed, as by azeotropic distillation or by preliminary drying of the plastics feed. Water is undesirable because it has been observed that water will seriously alter the rate of separation of the components, thus making the process unPconomical.

The solvent is a volatile organic liquid having a boiling point sufficiently different from that of the non-solvent to permit economical separation and recovery of solvent and non-solvent by fractional distillation of an admixture thereof. While the solvent may be one which is capable of dissolving up to its own weight of vinyl chloride polymer, the preferred solvents are those which will dissolve about 5–50% of their weight of vinyl chloride polymer at elevated temperatures and substantially atmospheric pressure, and more preferably 15–35%, since the higher solubilities result in solution viscosities which impede the efficiency of the subsequent steps in the process. Useful but less preferred solvents include the so-called partial solvents, that is, liquids which dissolve some of the vinyl chloride polymer, the balance remaining in a swollen state. By suitable recycling, extraction, agitation or addition of other solvents, the swollen plastic may be dissolved to the extent desired.

Representative solvents include keytones having 3–8 carbon atoms, both aliphatic and alicyclic, such as acetone, methylethyl ketone, 2-penanone, 3-pentanoe, methylisobutyl ketone, methylisoamyl ketone, cyclopentanone, cyclohexanone, hexanones, heptanones, octanone, acetophenone, propiophenone, isophorone, and the like; esters having 4–10 carbon atoms, both aliphatic and alicyclic, such as ethyl acetate, ethyl propionate, butyl acetate, amyl acetate, ethylene carbonate, ethyl benzoate, and the like; ethers having 5–10 carbon atoms, both aliphatic and alicyclic, such as dibutyl ether, tetrahydrofuran, dioxane, ethylene glycol dimethyl ether, and the like; N-alkyl substituted amides having 5–10 carbon atoms, such as dimethyl formamide, N-methyl pyrollidone, and the like; aromatic hydrocarbons having 7–10 carbon atoms, such as toluene, xylene, and the like; and chlorinated hydrocarbons containing 1–4 carbon atoms such as carbontetrachloride, ethylene dichloride, propylene dichloride, 1,1,1-trichloroethane, and the like.

The foregoing solvents may be employed singly or in admixture. Typical mixtures are xylene and cyclohexanone, methylisobutyl ketone and toluene, dimethyl formamide and ethyl acetate. The only restrictuion on such admixtures is that the solvents be sufficiently mutually miscible and so that the solvents may be easily separated and recovered by distillation.

The non-solvents should be substantially non-aqueous and include not only the true non-solvents but also the so-called swelling solvents, that is, liquids which swell the vinyl chloride polymer but do not appreciably dissolve the polymer. The non-solvents preferably are volatile organic liquids containing 1–6 carbon atoms and may be employed singly or in admixture, or as non-aqueous azeotropes. The non-solvents therefore include the lower monohydroxy alkanols such as methanol, ethanol, isopropanol, butanol, and the like; glycols such as ethylene glycol, propylene glycol, and the like; the alcohol ethers, such as ethylene glycol monomethyl ether, ethylene glycol monethyl ether, and the like. The preferred non-solvents are methanol, isopropanol, and n-butanol.

Although the solvent may be added cold to the scrap plastics, it is preferred to first heat the solvent to about reflux temperature and then add the hot solvent to the scrap plastics feed. It is not important whether the solvent is added to the scrap, vice versa, or the ingredients are admixed simultaneously. The mixture of scrap plastics and hot solvent preferably is then maintained at an elevated temperature, preferably at reflux temperature of solvent or above by use of pressure, while being agitated, until substantially all of the vinyl chloride polymer has dissolved. The resulting mixture then is separated into liquid and solid phases, preferably by filtering while hot in order to avoid blinding the filter. If an excess of water is present the blinding is so severe as to impede further processing. The filtrate may be clear or cloudy. Cloudiness or opacity is due to pigments present in the filtrate.

The liquid phase or filtrate is thereafter contacted with the non-solvent, preferably by adding cold non-solvent to the hot filtrate while maintaining vigorous agitation, and optionally the admixture is refluxed or digested for sufficient time to precipitate substantially all of the vinyl chloride polymer composition. The non-solvent may also be added hot but in the usual case it has a lower boiling point than the solvent, and a cold addition helps to control the refluxing and turbulence for proper precipitation. During the non-solvent addition the temperature of the reaction mixture must be high enough to maintain fluidity and may range up to the boiling point of the solvent/non-solvent admixture. Such fluidity is conveniently obtained by reflux conditions. For example, in a methylisobutyl ketone-methanol system, the refluxing temperature will be in the range of about 60° to 160° C., depending on the proportions. The vigorous agitation is important to regulate paritcle size and occlusion of plasticizers and other ingredients in the precipitated vinyl chloride polymer composition.

The amount of non-solvent is dictated by the nature of the polymer and the desired partition of components between polymer and plasticizer compositions. Generally, a useful amount is between about 50% and 200% of the weight of solvent required to dissolve the vinyl chloride polymer, but the optimum amount depends on the concentration of vinyl chloride polymer in the solvent.

In the precipitation step it is also possible to classify the vinyl chloride polymer composition into fractions of various molecular weights by regulating in a known manner the quantity of non-solvent. The precipitated polymer composition is washed with hot non-solvent to remove other ingredients of the composition, such as plasticizers, and dried to the extent desired.

The filtrate from the precipitation step is clear (free of pigment) and contains the solvent, the non-solvent, and a plasticizer composition which usually includes emulsifiers, stabilizers, oligomers, and other ingredients of polymerization not removed in earlier separations. This solution is then fractionally distilled to separate and recover the solvent and non-solvent, which are then recycled in the process as desired. The non-distilled residue contains the plasticizer composition which may be washed and dried, or the components thereof may be separated and recovered. For many manufacturing uses, however, the residue may be used as is, or with minimum washing and drying. It is also practical to separate and recover the ingredients of the plasticizer composition, that is, plasticizer, stabilizers, emulsifiers, and other ingredients, by chemical treatments or by vacuum distillation of the pot residue.

Considerable variation is possible within the scope of the invention as set forth above. For example, if the scrap plastics feed contains cotton fabric, the coarse solids removed by the filtration following the solvent addition step may be washed with water, alone or in combination with detergents and recycled solvent, for recovery of the fabric ingredients. Moreover, the filtrate resulting from the solvent addition step may be additionally fine-filtered or chemically treated in a known manner to remove pigments and fillers containe dtherein to remove these ingredients, before the final filtrate is contacted with the vinyl chloride polymer non-solvent. It will also be evident that means other than filters and settling basins may be employed to separate the ingredients at various stages. For example, centrifugation may be employed to separate the initial solvent and extraneous insolubles, pigments and fillers and to aid in the washing and recovery of fabric, and in the classifying of the resins in the vinyl chloride polymer composition. Decanting prior to filtration or centrifugation is also a suitable separation technique, alone or in combination with the other approaches. Furthermore, the rate of dissolving in the solvent addition step and the rate of precipitation in the non-solvent addition step may be varied by control of agitation, temperature and pressure as well as by scrap particle size, and according to whether the process is operated in batch, continuous or semi-continuous fashion. Still further, the properties of the recovered vinyl chloride plastic composition and plasticizer compositions may be varied by the addition of flocculants, pigments, processing aids, and the like, at appropriate stages in the process, to satisfy commercial specifications. The particle size of the products may also be controlled in a known manner by conditions of settling, digesting and washing at various stages of the process.

The drawing is a flow sheet illustration of the process of the invention. With reference thereto, a vinyl chloride polymer scrap plastics feed 10 may typically contain the eight listed ingredients wherein the resin component is a vinyl chloride polymer as defined above. The first essential stage of the process is the solvent addition step 11 which is followed by a separation step represented by a filtration 12. The coarse solids (solvent insolubles) resulting from the filtration may then be further treated in a recovery stage 13, as by washing to remove fabric and associated insolubles, and to separate the solvent. The filtrate from stage 12 may be concentrated to remove solvent, and then centrifuged, settled, or further fine-filtered to remove components such as pigments and fillers. In a preferred embodiment of the invention the pigments and fillers are left in the filtrate and are then coprecipitated at stage 14, while the filtrate is hot and with suitable agitation, with a non-solvent, coincident with precipitation of the vinyl chloride polymer composition. By suitable choice of non-solvent and quantities thereof it is also possible at this point to classify the polymer composition into resins of various molecular weights or, when mixed plastics are in the feed, to separate the resins by type of polymer, followed by washing and drying of the resins as desired, as at stage 15.

The filtrate from the non-solvent addition step 14 is then fractionally distilled at stage 16 to separate and recover the solvent and non-solvent for removal to holding tanks 17 and 18. The solvent then may be recycled to washing stage 13 and solvent addition stage 11 and the non-solvent may be recycled to the non-solvent addition stage 14.

The following Examples are intended as further illustration of the invention but are not necessarily limitative except as set forth in the claims. All parts and percentages are by weight unless otherwise indicated.

Example 1

Scraps from the fabrication of polyvinyl chloride plastic articles, 50 g., were added to 200 g. of methyl isobutyl ketone (MIBK). The admixture was then heated to reflux and filtered. To the hot opaque filtrate was then added 200 g. of methanol with agitation. A precipitate immediately formed and the warm solution (about 50° C.) was then filtered. The solid phase was a polyvinyl chloride press cake composition containing pigments and fillers. The press cake was washed with methanol and dried to give 33 g. of polyvinyl chloride resin containing pigments and fillers. The clear filtrate from the precipitation and filtration, containing the MIBK and methanol and residuals, was then fractionally distilled to separate and recover each of the MIBK and methanol, leaving a residue containing the plasticizer product weighing 16.5 g. Total recovery was 98% based on the scrap vinyl chloride plastics charge.

Examples 2–9

The process of Example 1 was repeated in all essential respects except that the following solvents and non-solvents and quantities thereof, were substituted for the MIBK and methanol of Example 1. In each case the total recovery based on scrap vinyl chloride plastics charge was at least 95%.

TABLE I

| Ex. | To dissolve | Amount (cc.) | To precipitate | Amount (cc.) |
|---|---|---|---|---|
| 2 | MIBK | 250 | Methanol | 250 |
| 3 | DMF | 100 | do | 75 |
| 4 | Cyclohexanone | 150 | Isopropyl alcohol | 150 |
| 5 | Amyl acetate | 300 | Methanol | 300 |
| 6 | Xylene | 250 | Butyl alcohol | 250 |
| 7 | Tetrahydrofuran | 200 | Ethylene glycol | 150 |
| 8 | MEK (methylethylketone) | 250 | Methanol | 250 |
| 9 | MEK | 250 | MEK-methanol azeotrope | 250 |

Example 10

One pound of scrap plastic containing the following materials:

1. White vinyl chloride polymer chips
2. Yellow vinyl chloride polymer chips
3. Tan vinyl chloride polymer foam
4. Vinyl chloride coated fabric chips
5. Geon 135
6. V R 50
7. V R 53
8. Uvinol 525s
9. Black polyurethane chips was added to 3500 cc. of MIBK and the mixture brought to reflux. The hot mixture was filtered, and the cake washed with 500 cc. of hot MIBK. The filter pad contained 27.3 g. of a mixture of polyurethane, foreign plastic chips and cotton fibers, representing 6.1% recoverey based on the charge. A total of 4200 cc. of methanol was then added to the vigorously stirred filtrate with the temperature held between 53–59° C., to effect total precipitation. The hot mixture was filtered and the filter cake was washed with 500 cc. of hot methanol. The solids were dried to give 304.3 g. (67% of charge) of a vinyl chloride resin product.

The MIBK and methanol were separated by distillation and the residue, containing plasticizer and weighing 125.7 g. (27.7% of charge), was collected. The total recovery was 100.8%, probably including some solvent mixed with the residues since a solvent odor was noticed in the residues due to incomplete drying.

The residue, when admixed with recovered or virgin vinyl chloride polymer, provided a commercially useful product. Homogeneity of the mixture of residue with the recovered vinyl chloride polymer was superior to mixtures with virgin polymer and the mixture exhibited improved dispersibility, processibility and superior "hand". A typical re-admixed product, containing 60–90% recovered vinyl chloride polymer product and up to 40% recovered plasticizer product typically gave the following properties:

TABLE II

| Test | Results |
|---|---|
| Tensile strength, p.s.i. | 1000–3000 |
| Elongation, percent | 250–450 |
| 100% Modulus, p.s.i. | 500–2000 |
| Hardness, Shore "A" | 60–90 |
| Fade-Ometer Aging @ 40 hours | (1) |

¹ Comparable to Standard.

Examples 11–19

The procedure of Example 10 was repeated in all essential respects except for the following solvent/non-solvent. combinations. In each case the recovery was at least 95% based on plastics charge.

TABLE III

| Ex. | Solvents to dissolve | Amount (cc.) | Solvents to precipitate | Amount (cc.) |
|---|---|---|---|---|
| 11 | MEK | 4,000 | Methanol | 4,000 |
| 12 | Cyclohexanone | 3,000 | do | 3,500 |
| 13 | do | 1,500 | Ethanol | 3,500 |
| 14 | Xylene | 2,500 | | |
| 15 | DMF | 1,500 | Iso-butanol | 1,500 |
| 16 | MIBK | 2,000 | Iso-propyl alcohol | 3,500 |
| 17 | Toluene | 2,000 | do | 3,000 |
| 18 | Tetrahydrofuran | 4,500 | Propylene glycol | 3,000 |
| 19 | MEK | 4,000 | MEK plus (azeotrope) | 1,000 |
| | | | Methanol | 4,000 |

Example 20

A scrap mixture containing all of the ingredients in Example 10, plus polycarbonate, polyacetal, nylon, silicone and polystyrene chips, is treated essentially in the same manner as described in Example 10. The non-vinyl chloride plastics which are insoluble in the solvent remain with the cotton fibers in the first filtration.

Example 21

A 500 g. sample of scrap containing vinyl chloride plastic, as described in Example 10, was dissolved in 3000 cc. of recovered MIBK. To the combined filtrate was added 3.5 liter of recovered methanol containing 10% MIBK, whereupon a precipitate immediately formed. Following this non-solvent addition, the process of Example 10 was repeated in all essential respects.

The yields of recovered products were as follows:

|  | G. |
|---|---|
| Resin product | 330 |
| Insolubles and fibers | 32 |
| Plasticizer product | 135 |
| Total | 497 |

While the invention has been illustrated and described in what are considered to be the most practical and preferred embodiments, it will be recognized that many variations are possible and come within the scope thereof, the appended claims therefore being entitled to a full range of equivalents.

What is claimed is:

1. A process for recovering a reusable vinyl chloride polymer composition from scrap plastic resulting from the manufacture of articles from a vinyl chloride polymer composition and a plasticizer composition therefor, which comprises the steps of: (a) contacting said scrap plastic with a solvent for said vinyl chloride polymer to form a single liquid phase, (b) contacting the resulting liquid phase with a substantially non-aqueous non-solvent for said vinyl chloride polymer, said non-solvent being effective to dissolve said plasticizer composition, and (c) separating the resulting solid phase containing said vinyl chloride polymer composition to leave a liquid phase containing said plasticizer composition, said solvent and non-solvent being mutually miscible.

2. The process of claim 1 wherein insoluble materials are removed before step (b) by filtering.

3. The process of claim 1 wherein insoluble materials are removed before step (b) by centrifuging.

4. The process of claim 1 wherein insoluble materials are removed before step (b) by settling.

5. The process of claim 1 wherein said solvent is tetrahydrofuran, methylethyl ketone, methylisobutyl ketone, cyclohexanone or dimethyl formamide, and the non-solvent is methanol, isopropanol, n-butanol, or an azeotrope of methylethyl ketone and methanol.

6. The process of claim 1 wherein the solvent is heated before addition to the scrap plastic and is capable of dissolving about 5–50% of its weight of said vinyl chloride polymer.

7. The process of claim 1 wherein the amount of non-solvent is about 50%–200% by weight of the amount of solvent.

8. The process of claim 1 wherein said non-solvent is added to said liquid phase with vigorous agitation and while said liquid phase is at an elevated temperature.

9. The process of claim 1 including the step of fractionally distilling the liquid phase resulting from step (c) to separate said plasticizer composition and to recover said solvent and non-solvent.

10. The process of claim 1 including the steps of classifying, washing and drying the vinyl chloride polymer composition resulting from step (c).

11. A process for separaitng a reusable vinyl chloride polymer composition and a reusable plasticizer composition for said vinyl chloride polymer, from scrap plastic resulting from the manufacture of articles from a vinyl chloride polymer composition and a plasticizer composition therefor, which comprises the steps of:
(a) contacting said scrap plastic with a hot solvent for said vinyl chloride polymer,
(b) filtering the resulting mixture to remove insoluble materials and to leave a first liquid phase,
(c) adding to said first liquid phase, with agitation and while said phase is at an elevated temperature, a non-solvent for said vinyl chloride polymer, said non-solvent being effective to dissolve said plasticizer composition,
(d) separating the resulting solid phase containing said vinyl chloride polymer composition to leave a second liquid phase, and
(e) fractionally distilling said second liquid phase to separate and recover said solvent and non-solvent, and to leave said reusable plasticizer composition;

wherein said non-solvent is substantially non-aqueous, and said solvent and non-solvent are mutually miscible.

12. The process of claim 11 wherein the filtrate resulting from step (b) is concentrated before step (c).

13. The process of claim 1 wherein said vinyl chloride polymer composition includes pigment and filler and said plasticizer composition includes stabilizer and emulsifier.

14. The process of claim 1 wherein said scrap plastic includes a fabric material.

References Cited

UNITED STATES PATENTS

| | | | |
|---|---|---|---|
| 3,666,691 | 5/1972 | Spiller | 260—2.3 |
| 2,862,895 | 12/1958 | Cummings | 260—2.3 |
| 3,111,506 | 11/1963 | Roussillon et al. | 260—92.8 A |

WILBERT J. BRIGGS, SR., Primary Examiner

U.S. Cl. X.R.

260—92.8 A

-1050
(5/69)

UNITED STATES PATENT OFFICE
CERTIFICATE OF CORRECTION

Patent No. 3,836,486                    Dated Sept. 17, 1974

Inventor(s) Edwin A. Hafner

It is certified that error appears in the above-identified patent and that said Letters Patent are hereby corrected as shown below:

Column 1, fifth line from bottom, "uphosltery should read -- upholstery --. Column 4, line 43, "keytones" should read -- ketones --. Column 4, line 45, "2-penanone" should read -- 2-pentanone --. Column 4, line 45, "3-pentanoe" should read -- 3-pentanone --. Column 5, line 39, "160°·C" should read -- 116° C --. Column 6, line 10, "containe dtherein" should read -- contained therein --. Column 7, line 65, "recoverey" should read -- recovery --.

Signed and sealed this 26th day of November 1974.

(SEAL)
Attest:

McCOY M. GIBSON JR.
Attesting Officer

C. MARSHALL DANN
Commissioner of Patents